(12) United States Patent
Huang et al.

(10) Patent No.: US 7,447,046 B2
(45) Date of Patent: Nov. 4, 2008

(54) MOUNTING APPARATUS FOR DRIVE BRACKET

(75) Inventors: Bin Huang, Shenzhen (CN); Bi-Qiang Li, Shenzhen (CN); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/558,465

(22) Filed: Nov. 10, 2006

(65) Prior Publication Data

US 2007/0176074 A1    Aug. 2, 2007

(30) Foreign Application Priority Data

Jan. 17, 2006    (CN) .................. 2006 2 0054309

(51) Int. Cl.
*H05K 7/02* (2006.01)
*H05K 7/04* (2006.01)

(52) U.S. Cl. .................. 361/810; 361/685; 361/679; 361/680

(58) Field of Classification Search .................. 361/679, 361/685, 683, 680, 810
See application file for complete search history.

(56) References Cited

U.S. PATENT DOCUMENTS

| | | | | |
|---|---|---|---|---|
| 6,005,768 A | * | 12/1999 | Jo .............................. | 361/685 |
| 6,377,449 B1 | * | 4/2002 | Liao et al. .................. | 361/685 |
| 6,771,496 B1 | * | 8/2004 | Wu ............................ | 361/685 |
| 7,036,783 B2 | * | 5/2006 | Chen et al. ................ | 248/298.1 |
| 2004/0075978 A1 | * | 4/2004 | Chen et al. ................. | 361/685 |
| 2006/0164803 A1 | * | 7/2006 | Chen et al. ................. | 361/685 |
| 2007/0025068 A1 | * | 2/2007 | Chen et al. ................. | 361/679 |
| 2007/0176074 A1 | * | 8/2007 | Huang et al. ............... | 248/639 |

* cited by examiner

*Primary Examiner*—Dean A. Reichard
*Assistant Examiner*—Andargie M Aychillhum
(74) *Attorney, Agent, or Firm*—Wei Te Chung

(57) ABSTRACT

A mounting apparatus for mounting a drive bracket on which a protruding portion is provided, includes an enclosure, and a mounting member. The enclosure includes a base wall for supporting the drive bracket thereon, a side wall extending from one side of the base wall, and a holder extending from the side wall. The mounting member is movably attached to the holder. The mounting member includes a locking portion extending therefrom for engaging with the protruding portion of the drive bracket.

14 Claims, 4 Drawing Sheets

MOUNTING APPARATUS FOR DRIVE BRACKET

BACKGROUND OF THE INVENTION

1. Field of the Invention

The present invention relates to mounting apparatuses, and more particularly to a mounting apparatus which readily allows securely installing or removing a drive bracket to or from an electronic device.

2. Description of Related Art

Generally, a computer enclosure includes a drive bracket for accommodating data storage devices such as hard disk drives, floppy disk drives, compact disc read-only memory drives, etc. The drive bracket is often secured to the computer enclosure with screws. However, this mounting means can be very inconvenient, laborious and time-consuming.

Another kind of computer enclosure includes a frame body, a first drive bracket, a second drive bracket, a slide structure, and a retaining device. The first and second drive brackets are used to accommodate the data storage devices. The first drive bracket is fixedly locked in the frame body. The second drive bracket is pivotably joined on the frame body. Through sliding of the slide structure, the second drive bracket can be turned over to facilitate assembly or disassembly for a computer maintenance technician. Contrarily, the second drive bracket can reach a predetermined position to let the second drive bracket be hooked on the first drive bracket through retaining of the retaining device, thereby achieving the object of positioning. However, this mounting means for securing the second drive bracket to the first drive bracket is rather complicated.

What is needed, therefore, is a mounting apparatus which conveniently and securely secures a drive bracket in a computer.

SUMMARY OF THE INVENTION

In one preferred embodiment, a mounting apparatus for mounting a drive bracket on which a protruding portion is provided, includes an enclosure, and a mounting member. The enclosure includes a base wall for supporting the drive bracket thereon, a side wall extending from one side of the base wall, and a holder extending from the side wall. The mounting member is movably attached to the holder. The mounting member includes a locking portion extending therefrom for engaging with the protruding portion of the drive bracket.

Other advantages and novel features will become more apparent from the following detailed description of preferred embodiments when taken in conjunction with the accompanying drawings, in which:

DETAILED DESCRIPTION OF THE INVENTION

Figure 1:
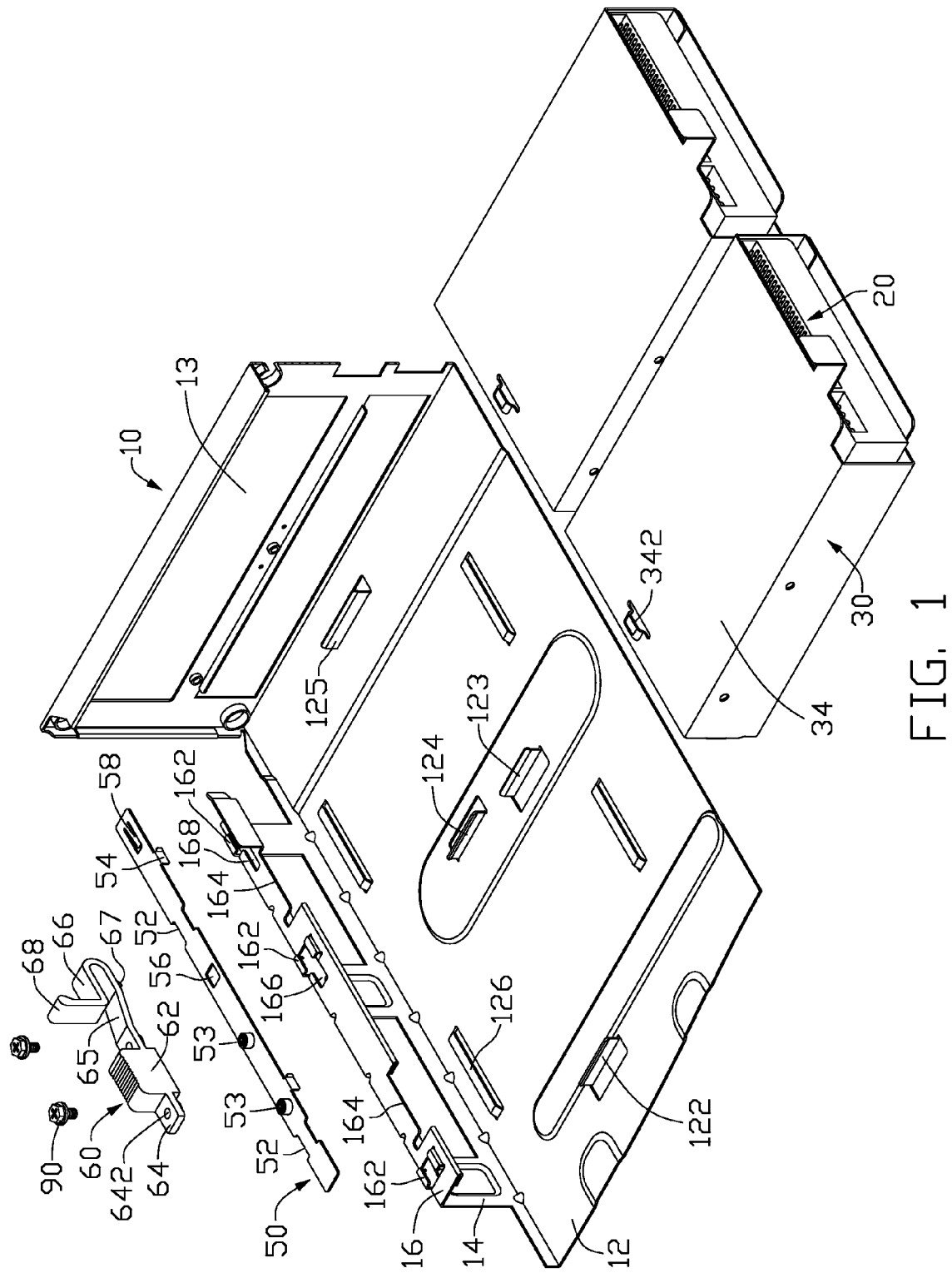
FIG. 1 is an exploded, isometric view of a mounting apparatus in accordance with a preferred embodiment of the present invention, together with two drive brackets and two data storage devices.

Referring to FIG. 1, in a preferred embodiment of the invention, a mounting apparatus is provided for mounting two drive brackets 30 each configured for holding a data storage device 20. The mounting apparatus includes an enclosure 10, a mounting member 50, an operating member 60, and two screws 90.

The enclosure 10 includes a base wall 12, an end wall 13 perpendicularly extending from one end of the base wall 12, and a side wall 14 perpendicularly extending from a side of the base wall 12. A first tab 122, a second tab 123, a third tab 124, and a fourth tab 125 in parallel with one another extend out from the base wall 12. Four bridge-shaped securing portions 126 protrude out from the base wall 12. Two of the securing portions 126 are located between the first tab 122 and the second tab 123, the other two of the securing portions 126 are located between the third tab 124 and the fourth tab 125. A holder 16 extends from the side wall 14, and is generally parallel with the base wall 12. Three pairs of aligned L-shaped retaining portions 162 extend from the holder 16. Two first cutouts 164 are defined in the holder 16 at one side opposite to the side wall 14. A slot 166 is defined in a middle portion of the holder 16. A slit 168 is defined in the holder 16 adjacent the end wall 13.

The mounting member 50 has a generally elongated body. Two pairs of second cutouts 52 are defined in the mounting member 50 at opposite ends respectively. Two posts protrude out from the mounting member 50. A mounting hole 53 is defined in each post. Two locking portions 54 extend down from one side of the mounting member 50. A locating hole 56 is defined in the mounting member 50 at a middle portion. A resilient tongue-shaped tab 58 slantingly extends down from the mounting member 50 at one end thereof.

The operating member 60 includes a main portion 62, two mounting portions 64 extending from opposite ends of the main portion 62 respectively, an inclined portion 65 slantingly extending down from a free end of one of the mounting portions 64, and a U-shaped operating portion 66 extending from a free end of the inclined portion 65. A through hole 642 is defined in each mounting portion 64. A blocking portion 67 protrudes down from the operating portion 66 near the inclined portion 65. A handle 68 extends up from a distal end of the operating portion 66.

Figure 2:
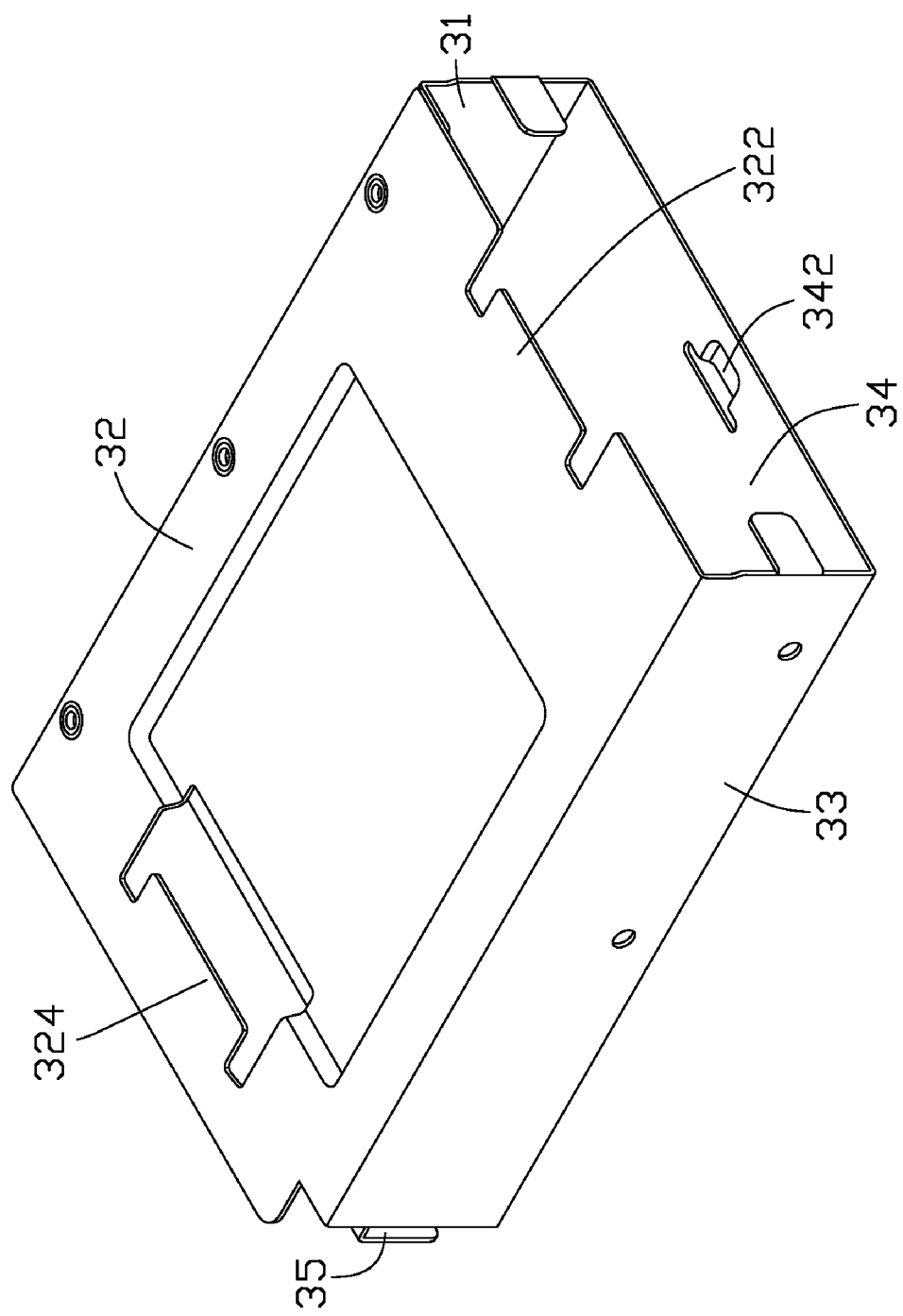
FIG. 2 is an inverted and enlarged view of one drive bracket of FIG. 2.

Referring also to FIG. 2, each drive bracket 30 is generally box-shaped with two openings at opposite sides thereof. Each drive bracket 30 includes a first sidewall 31, a second sidewall 32 connected to the first sidewall 31, a third sidewall 33 connected to the second sidewall 32, and a fourth sidewall 34 connected to the third sidewall 33 and the first sidewall 31. The first sidewall 31 is parallel to the third sidewall 33, and the second sidewall 32 is parallel to the fourth sidewall 34. An L-shaped grip 35 extends from an end of the fourth sidewall 34. A protruding portion 342 protrudes out from an opposite end of the fourth sidewall 34. A first inserting tab 322 and a second inserting tab 324 extend from the second sidewall 32 at two opposite ends respectively.

Figure 3:
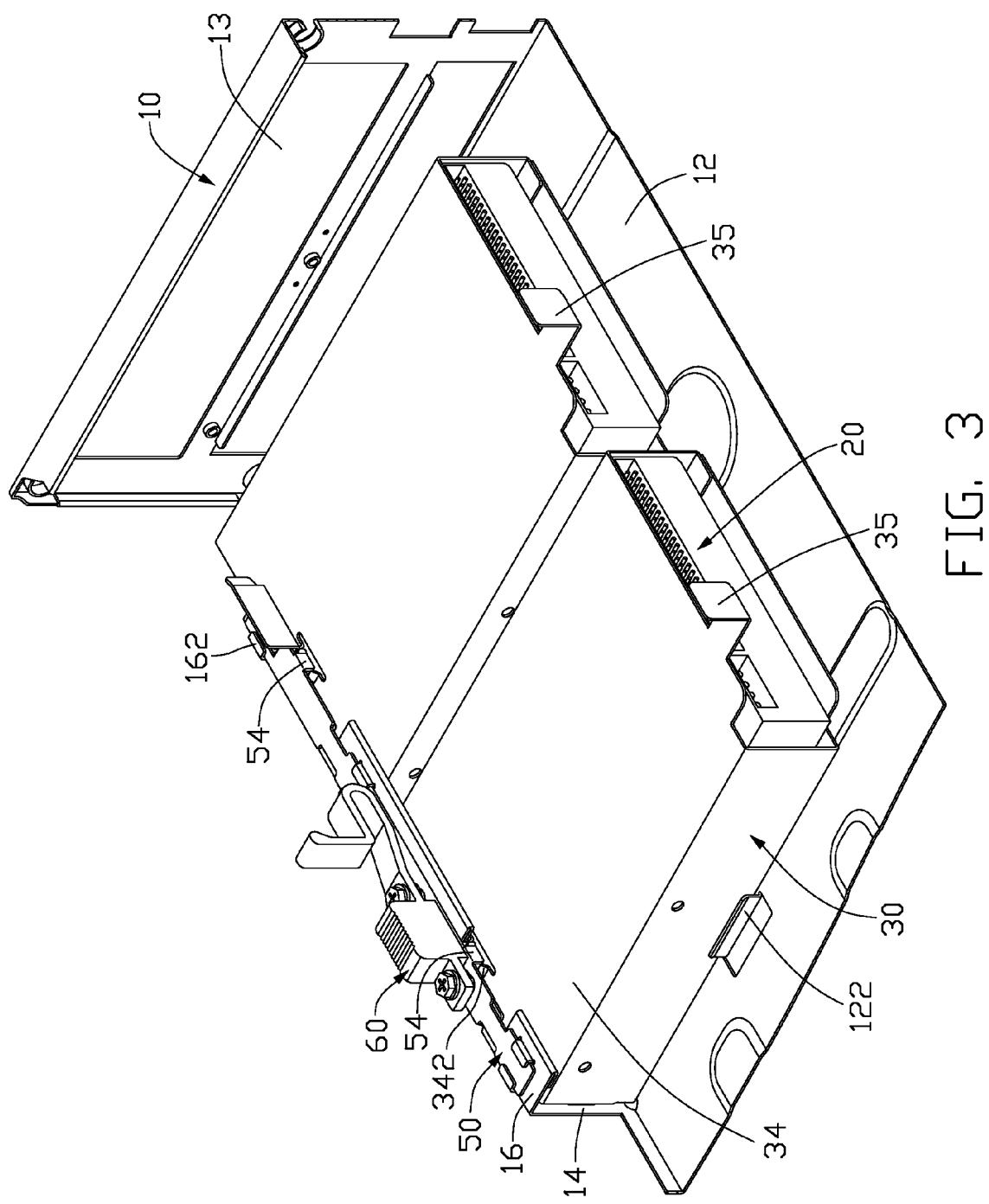
FIG. 3 is an assembled view of FIG. 1, showing the mounting apparatus in a locked state.

Referring also to FIG. 3, in assembly, the mounting member 50 is placed in the vicinity of the holder 16 of the enclosure 10, with the two pairs of second cutouts 52 thereof aligning with the two corresponding pairs of retaining portions 162 of the holder 16, respectively. The locking portions 54 are located in the corresponding first cutouts 164 respectively. The mounting member 50 is pressed firmly against the holder 16, and then moved toward the end wall 13 to be slidably received in and retained by the retaining portions 162 of the holder 16. During this time, the tongue-shaped tab 58 is first depressed then rebounds to engage in the slit 168 to prevent accidental withdrawal of the mounting member 50 when used. The operating member 60 is mounted to the mounting member 50 with the two screws 90 extending through the corresponding through holes 642 of the operating member 60 to engage in the corresponding screw holes 53 respectively.

In mounting, one drive bracket 30 is placed between the first tab 122 and the second tab 123, and the other drive bracket 30 is placed between the third tab 124 and the fourth tab 125. Each drive bracket 30 is pushed toward the side wall 14 until the first and second inserting tabs 322, 324 of the drive bracket 30 are locked by the corresponding securing portion 126 respectively. The operating member 60 is operated to move the mounting member 50 toward the end wall 13 until a corresponding locking portion 54 of the mounting member 50 engages with the protruding portion 342 of the drive bracket 30. Thus, the drive bracket 30 is mounted to the enclosure 10. The blocking portion 67 of the operating member 60 extends through the locating hole 56 of the mounting member 50 and engages in the slot 166 of the holder 16 for locating the mounting member 50.

Figure 4:
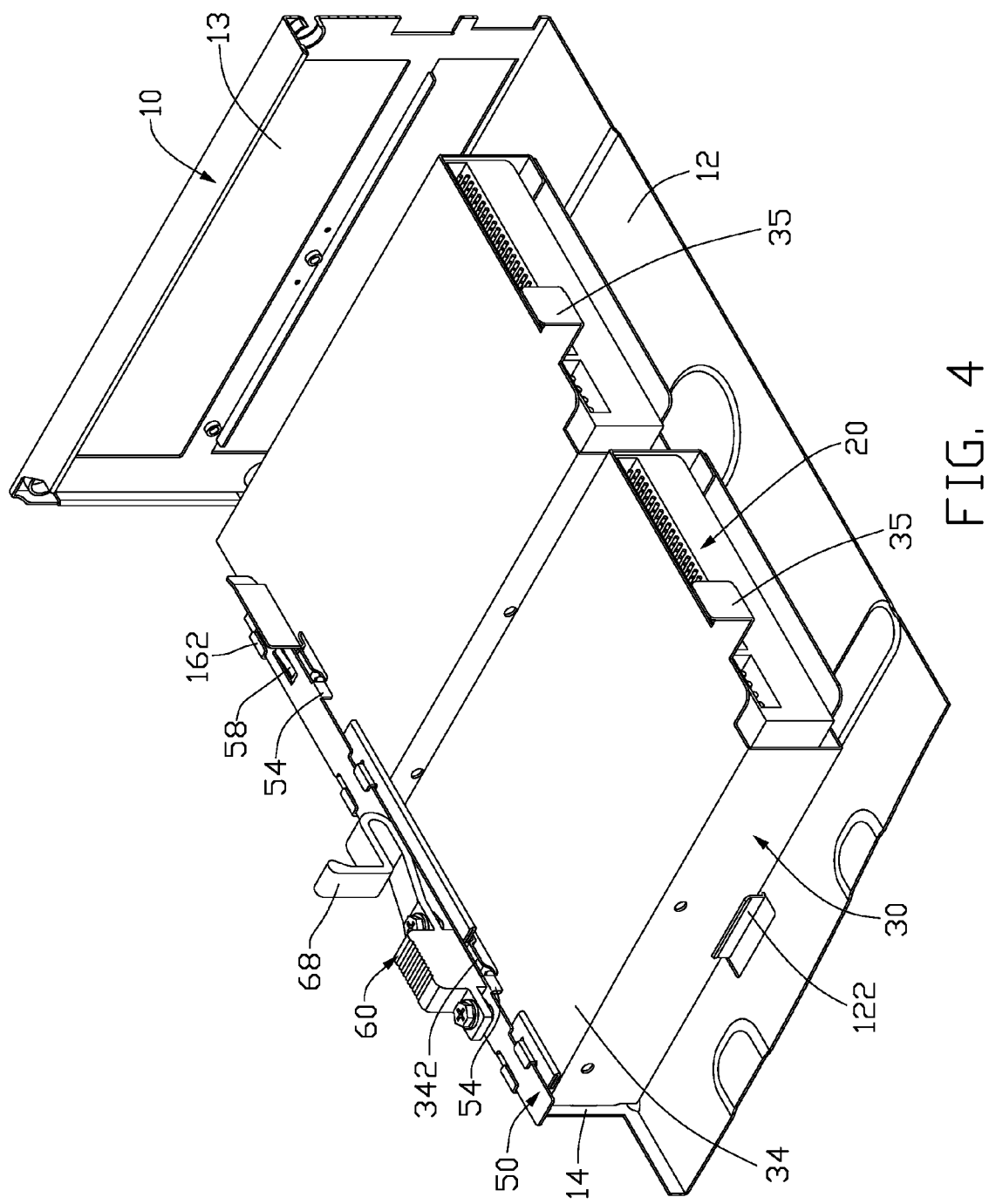
FIG. 4 is similar to FIG. 3, but showing the mounting apparatus in an unlocked state.

Referring also to FIG. 4, to detach each drive bracket 30 from the enclosure 10, the handle 68 of the operating member 60 is operated to deform the operating portion 66. The blocking portion 67 of the operating member 60 is disengaged from the slot 166 of the holder 16. Then the operating member 60 is pushed to move the mounting member 50 away from the end wall 13 until the corresponding locking portion 54 disengages from the protruding portion 342 of the drive bracket 30. Thus, the drive bracket 30 is readily removed by pulling the grip 35 of the drive bracket 30.

In another preferred embodiment of the invention, the protruding portion 342 may be a separate member mounted to the drive bracket 30.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus for mounting a drive bracket on which a protruding portion and at least one tab are provided on opposite sides thereof respectively, the mounting apparatus comprising:
   an enclosure comprising a base wall on which at least one securing portion protrudes corresponding to the at least one tab, a side wall extending from one side of the base wall, and a holder extending from the side wall to be parallel with the base wall, the at least one securing portion being configured for receiving the at least one tab of the drive bracket;
   a mounting member movably attached to the holder, the mounting member comprising a locking portion extending therefrom towards the base wall for blocking the protruding portion of the drive bracket so that the drive bracket is prevented from being ejected from the space; and
   an operating member comprising a fixing end secured to the mounting member, and a resilient cantilever and extending through the mounting member to engage with the holder when the mounting member is moved to block the protruding portion.

2. The mounting apparatus as claimed in claim 1, wherein a pair of retaining portions extends from the holder for slidably retaining the mounting member on the holder.

3. The mounting apparatus as claimed in claim 1, wherein a slit is defined in the holder, a tongue-shaped tab extends from the mounting member for engaging in the slit.

4. The mounting apparatus as claimed in claim 1, wherein the operating member defines two through holes, the mounting member defines two screw holes, two screws extend through the through holes to engage in the corresponding screw holes.

5. The mounting apparatus as claimed in claim 1, wherein the mounting member defines a locating hole, the holder of the enclosure defines a slot, a blocking portion protrudes from the operating member for extending through the locating hole to engage in the slot.

6. The mounting apparatus as claimed in claim 1, wherein two tabs protrude from the base wall for slidably sandwiching the drive bracket therebetween.

7. The mounting apparatus as claimed in claim 2, wherein a pair of cutouts are defined in the mounting member for avoiding the retaining portions of the holder when mounting the mounting member to the holder.

8. An assembly comprising:
   an enclosure comprising a base wall, a side wall extending from one side of the base wall, and a holder extending from a side of the side wall other than an opposite side thereof that the base wall is connected;
   a drive bracket providing a protruding portion thereon, the drive bracket slidably attached to the base wall, and restricted by the base wall to be movable only along a first direction;
   a mounting member comprising a locking portion extending therefrom towards the drive bracket, the mounting member being attached to the holder and movable relative to the holder along a second and a third direction opposite to each other, therefore allowing the locking portion to engage with the protruding portion of the drive bracket to restrict the drive bracket to be immovable along the first direction; and
   an operating member comprising a fixing end secured to the mounting member, and a resilient cantilever end extending through the mounting member to engage with the holder when the mounting member is moved to block the protruding portion.

9. The assembly as claimed in claim 8, wherein a pair of retaining portions extends from the holder for retaining the mounting member.

10. The assembly as claimed in claim 8, wherein a slit is defined in the holder, a tongue-shaped tab extends from the mounting member for engaging in the slit.

11. The assembly as claimed in claim 8, wherein the mounting member defines a locating hole, the holder of the enclosure defines a slot, a blocking portion protrudes from the operating member for extending through the locating hole to engage in the slot.

12. The assembly as claimed in claim 8, wherein the base wall comprises two tabs and a securing portion, the drive bracket is accommodated between the tabs, the securing portion locks one sidewall of the drive bracket opposite to the protruding portion.

13. An assembly comprising:
   an enclosure comprising a base wall, a side wall extending up from a front end of the base wall, and a holder extending rearward from a top of the side wall;
   a drive bracket comprising a protruding portion extending from a front portion of a top wall thereof, the drive bracket slidable along the base wall in a back-to-front direction until the front portion thereof is received in a space bounded by the base wall, the side wall and the holder;

a mounting member mounted on the holder and slidable along a direction parallel with the side wall, a locking portion depending from the mounting member and movable together with the mounting member to align with the protruding portion in said back-to-front direction or offset from the protruding portion, thereby to block a rear end of the protruding portion or to release the protruding portion; and an operating member comprising a fixing end secured to the mounting member, and a resilient cantilever end extending through the mounting member to engage with the holder when the mounting member is moved to block the protruding portion.

14. The assembly as claimed in claim 9, wherein a pair of cutouts are defined in the mounting member for avoiding the retaining portions of the holder when mounting the mounting member to the holder.

* * * * *